United States Patent [19]

Linder et al.

[11] Patent Number: 4,468,949
[45] Date of Patent: Sep. 4, 1984

[54] APPARATUS FOR DETECTING OPERATING DATA OF AN INTERNAL COMBUSTION ENGINE

[75] Inventors: Ernst Linder, Mühlacker; Karl-Otto Linn, Karlsruhe; Winfried Moser, Markgröningen; Klaus Müller, Tamm; Erich Zabler, Karlsruhe, all of Fed. Rep. of Germany

[73] Assignee: Robert Bosch GmbH, Stuttgart, Fed. Rep. of Germany

[21] Appl. No.: 348,123

[22] Filed: Feb. 11, 1982

[30] Foreign Application Priority Data

Feb. 12, 1981 [DE] Fed. Rep. of Germany ....... 3105001

[51] Int. Cl.³ .............................................. G01L 23/22
[52] U.S. Cl. ...................................................... 73/35
[58] Field of Search ..................... 73/35, 116; 123/425, 123/435

[56] References Cited

U.S. PATENT DOCUMENTS 3,067,610 12/1962 Bockemuehl et al. ............. 73/35 X
3,754,139 8/1973 Swithenbank et al. ........... 73/116 X Primary Examiner—James J. Gill
Attorney, Agent, or Firm—Edwin E. Greigg

[57] ABSTRACT

An apparatus is proposed for detecting operating characteristics of an internal combustion engine. It has an optical sensor whose output signal is delivered to an amplifier with a variable transmission behavior. As a result, it is possible to have either a stepped or a continuous adaptation of the sensor sensitivity to various operational points of the engine. It is particularly proposed that the amplification for the measurement signal be selected to be high in the case of an opto-electrical combustion chamber observation in a low load range, while it is selected to be low in a high load range, so that relatively equalized measurement results are available for use.

6 Claims, 5 Drawing Figures

APPARATUS FOR DETECTING OPERATING DATA OF AN INTERNAL COMBUSTION ENGINE

BACKGROUND OF THE INVENTION

The invention is based on an apparatus having an optical sensor for detecting operating data of an internal combustion engine. The optical sensor generates an output signal via an amplifier to an evaluation circuit which interprets engine parameters. German Patent Application No. P 29 05 506.9 discloses an ignition onset sensor for internal combustion engines. It comprises an opto-electrical converter which communicates with the combustion chamber and whose signals may be used, for instance, for regulating the onset of ignition.

Processing optical signals derived from occurrences in the combustion chamber of an internal combustion engine is increasingly significant, because only in this manner is it possible to intervene directly into the operating behavior of an internal combustion engine. This is particularly important in seeking to attain the cleanest possible exhaust gas, smooth engine operation and economical fuel consumption.

The processing of opto-electrical signals is internal combustion engines has proved to be extremely problematical, because the signal transducers are relatively prone to soiling, and the danger thus exists that the measurement results will be adulterated. Problems also arise with the varying light yield when the engine load status varies.

OBJECT AND SUMMARY OF THE INVENTION

With the apparatus according to the invention for detecting operating data of an internal combustion engine with an opto-electrical sensor, it is assured that the ignition signals are always available in such a form that they can be processed satisfactorily, no matter what the engine load status or other variables may be. As a result, the desired optical regulation of the combustion chamber can be attained with relatively little difficulty.

An optical sensor is situated in a combustion chamber to detect the flash upon fuel combustion. If a weak light signal is detected the engine is idling, while if a strong light signal is detected the engine is operating at full load. Thus, the present apparatus can indicate engine parameters according to combustion flash.

The optical sensor may also comprise a laser light source and a light-sensitive sensor in the combustion chamber wherein the laser beam is interrupted by fuel injected into the chamber to detect instant of injection onset and duration of injection as described in U.S. Application Ser. No. 104,936, filed Dec. 8, 1979, to Komaroff et al, now abandoned.

An object of the present invention is to provide an optical sensor circuit which interprets operational parameters of the engine as a function of combustion flash.

A further object is to provide an optical sensor circuit which can be compensated for soiling of the optical sensor mounted in the combustion chamber.

The invention will be better understood and further objects and advantages thereof will become more apparent from the ensuing detailed description of preferred embodiments taken in conjunction with the drawings.

DESCRIPTION OF THE PREFERRED EMBODIMENT

The exemplary embodiments relate to optical observation of the combustion chamber in internal combustion engines, without regard to the principle by which they operate; that is, independently of whether they have self-ignition or externally-supplied ignition. While in the case of the gasoline engine, the ignition of the mixture is initiated by the spark plug and then spreads to the entire mixture in the combustion chamber, the optical signal in the case of the Diesel engine begins approximately at the time of the injection onset, delayed by the amount of the delay in ignition of the mixture. In either case, the flash created by the combustion of the mixture is detected by the optical sensor. A laser light source may also be provided, the strength of which is detected by a light sensitive sensor through injected fuel, which indicates injection onset or duration. The type of optical observation is not a major concern since the invention relates to the processing of the signal generated during optical observation.

Figure 1:
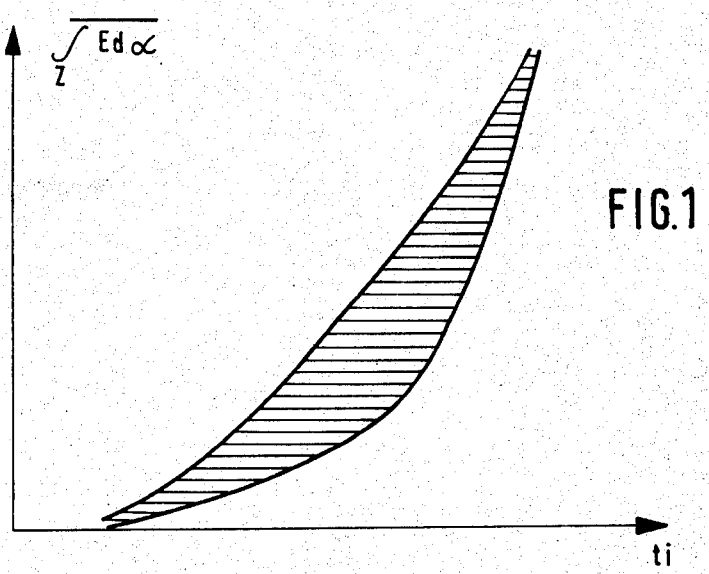
FIG. 1 is a graph showing the integral of the light intensity plotted over the duration of injection.

In an optical observation of fuel combustion in a combustion chamber, a photoreceiver receives light signals of a light intensity E having a course over time of E ($\alpha$). The symbol $\alpha$ is an angular indication of the crankshaft position. The absolute value of the light intensity E depends on various parameters. Measurements have shown that the greatest influence on the light intensity E is exerted by the fuel quantity QK introduced into the combustion chamber at combustion per cycle of the engine. QK is, of course, the quantity of fuel injected per stroke. FIG. 1 illustrates this relationship qualitatively. There, the duration of injection $t_i$, the variable proportional to the fuel quantity QK, is plotted on the abscissa. The ordinate shows the mean value of the integrals of the course of light intensity derived from a specified number of cycles. The shaded dispersion range is the result of other parameters, such as the instant of ignition.

The great width of variation in the integral values in accordance with the injection time or injection quantity may be seen in FIG. 1. This injection quantity, in turn, is directly related to the operational point at a particular time, that is, to idling or full load.

The apparatus of the present invention has a variable amplifier which makes it possible to average out the wide range of variation in the integral value of the course of light intensity according to FIG. 1, so as to attain a constant signal-to-noise ratio over the entire operational range and in order to create uniform conditions for signal evaluation by evaluator circuit 30. Evaluator circuit 30 interprets the signal $E_M$ (see FIG. 4) and alters engine operation accordingly, for instance exhaust gas recirculation valve position or fuel injection timing. However, the operation of evaluator circuit 30 is not part of the present invention.

Figure 2:
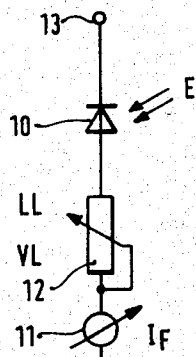
FIG. 2 is a highly simplified circuit diagram of the apparatus according to the invention.

FIG. 2 shows the apparatus according to the invention in its fundamental form. A photo diode 10, driven in the blocking direction, varies its blocking effect in accordance with the light intensity E. The variable blocking current then corresponds to a photoelectric current $I_F$, which can be indicated in an instrument 11. The adaptation of the sensitivity is effected via a load resistor 12. The series circuit shown of photo diode 10, measuring instrument 11 and load resistor 12 is located between the poles 13 and 14 of a source of supply voltage, not shown in further detail. For the sake of variable adjustability, the load resistor is embodied as a potentiometer, and its adjustment is determined by the operational point of the engine or by engine parameters in general.

The resistor 12 may also represent the feedback resistor of a current amplifier, which is intended to emit a signal at its output which is as independent as possible of the operational points of the engine. To attain this end, however, the amplification of this current amplifier must be varied via the adjustment of the resistor 12.

Figure 3:
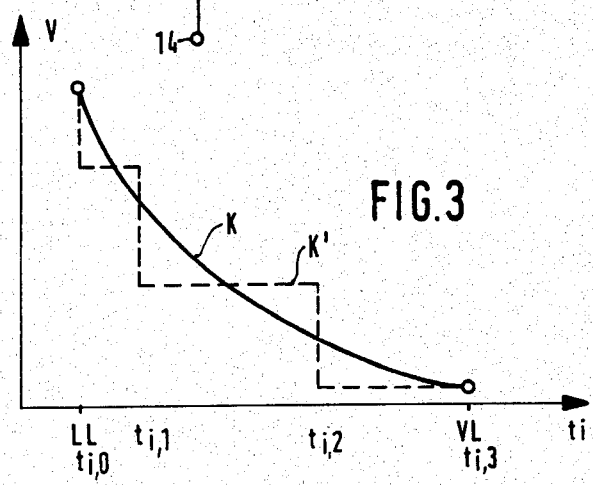
FIG. 3 is a diagram explaining the subject of FIG. 2.

The relationship between the operational point of the engine and the amplification V of a measurement circuit having the current amplifier including the resistor 12 is established via a continuous characteristic curve K or a stepped characteristic curve K', as shown in FIG. 3. In this graph, the dependence of the amplification V is shown by way of example over the duration of injection $t_i$. In order to avoid a constant switchover whenever the value for injection quantity has just assumed a switch point $t_i$, n (in the case of the stepped characteristic curve K'), a hysteresis may be provided.

A comparison of FIGS. 1 and 3 shows the contrary course of the two curves. Particularly in the case of idling, where the light signal is weak, this means high amplification; at full load, on the other hand, given the intense light phenomena at that engine status, this means weak amplification.

The curve shown in FIG. 3 can be extended in principle into a multi-dimensional family of curves (a shift of curve k), so that still further influential variables can be taken into consideration.

It has proved to be efficacious also to take the effects of soiling on the opto-electrical sensor into consideration in multiplicative fashion in processing the signals. This soiling is detected by forming the mean value over several cycles and comparing it with a set-point curve or a set-point value. $E_M$ then represents the measured light intensity, so that in the controlled measurement circuit, $E_M$ is proportional to $V \times E$.

Figure 4:
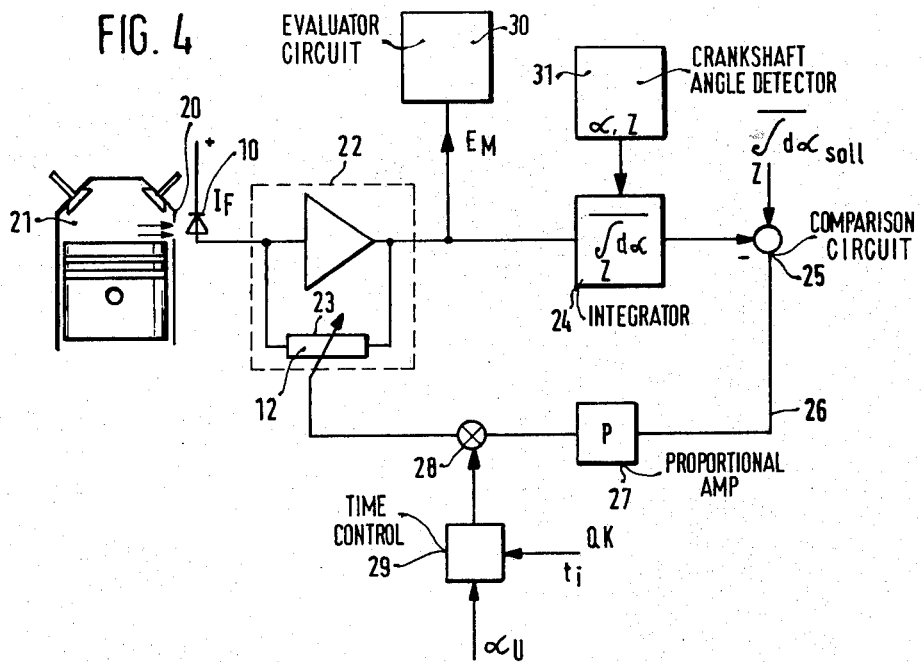
FIG. 4 is a detailed block circuit diagram for the schematically illustrated subject of FIG. 2.

FIG. 4 shows an apparatus according to the invention in the form of a block circuit diagram. The photo diode 10 has an optical connection 20 to the combustion chamber 21 of an internal combustion engine which detects the flash of combusting fuel in chamber 21. The blocking current $I_F$ of the photo diode 10 travels to a feedback amplifier 22 having the feedback resistor 23. At this output of this amplifier 22, the instantaneous measurement signal $E_M$ is then available for processing. It is integrated in a subsequent integrator 24 by a specific crankshaft angle from crankshaft angle detector 31 or by a specific number of engine cycles in order to form a mean value. In a subsequent comparison circuit 25, this is compared with a set-point value, which is a stored past value for the integrated measurement signal from the time when the combustion chamber window was clean. On the output side, a line 26 leads from the comparison circuit 25 to a proportional amplifier 27 and finally to a multiplier circuit 28. Its output signal, in turn, controls the value of the feedback resistor in the amplifier 22.

The essential point is that the variation of the amplification V of the amplifier 22 in the measurement circuit does not occur whenever the particular cylinder is executing a stroke at just that time. Otherwise, signal influences will appear which may be interpreted incorrectly by the evaluation circuits. For this reason, a variation which may be desired must take place in the dark phase of that cylinder, and it must terminate, at the latest, prior to ignition ($\alpha_E$) which characterizes an inflaming angle that takes place later than the ignition angle ($\alpha_z$), or ignition delay. This purpose is served by the second input of the multiplier circuit 28, which is preceded by a time control circuit 29. This circuit corresponds to a monostable multivibrator, is triggered by an ignition-signal and the duration of its output signal depends on the injection fuel quantity QK as the critical variable influencing the optical signal.

Thus, the integrator 24, comparison circuit 25, proportional amplifier 27, time control 29 and multiplier 28 are connected to the amplifier 22 in a feedback manner to vary the output $E_M$ of amplifier 22.

Figure 5:
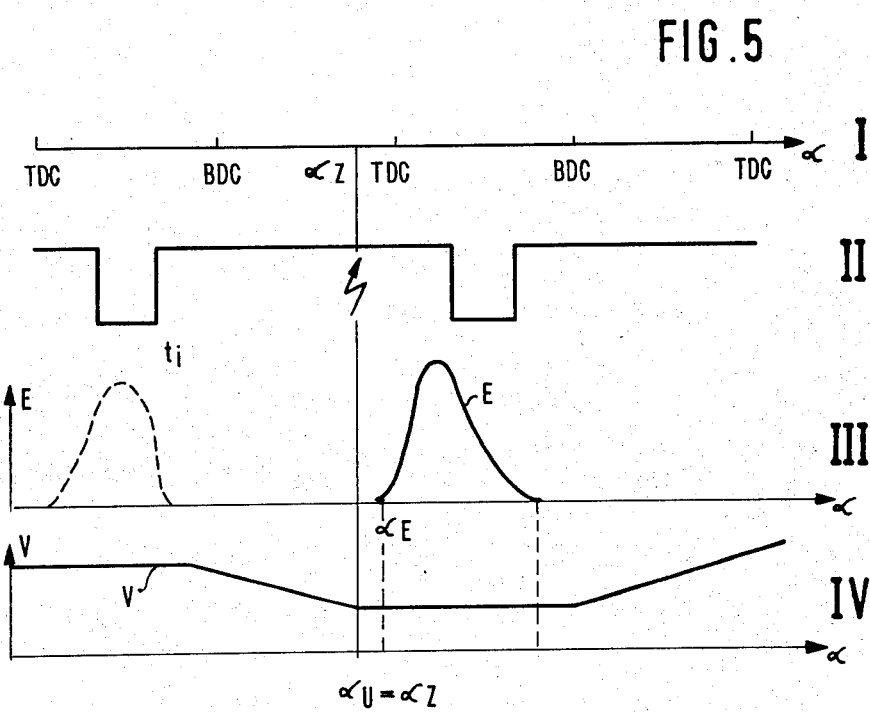
FIGS. 5-I to 5-IV provide pulse diagrams relating to the subject of FIG. 4.

The corresponding time diagram is shown in FIG. 5, where I indicates the crankshaft angle $\alpha$ for TDC (top dead center) and BDC (bottom dead center) for the piston movement, II the injection signals and the instant of ignition $\alpha_z$, that is, the negated injection signals, the duration of which is $t_i$ III the output signal of the photo diode 10 and, finally, IV the course over time of the variation in amplification in which $\alpha_U$ indicates the beginning of the constant signal level, which coincides with $\alpha_z$. The constant range adjacent to the appearance of an ignition signal identifies precisely—with a certain degree of assurance—the range in which no variation in amplification should be effected.

In gasoline injection, the injection event takes place whenever at least one cylinder is in the intake-stroke stage. This is followed directly by the compression stroke, and ignition takes place (in the example of FIG. 5, a predetermined ignition angle $\alpha_z$ before top dead center). After a predetermined delay, the mixture inflames and the result is a light intensity as shown in FIG. 5 III. The corresponding light signal is then evaluated in signal terms. In order not to have any change in the signal processing during the appearance of light signals, a time period of constant amplification is introduced as described above. This period, for the sake of simplicity, begins with an ignition signal as the trigger signal and it ends whenever the result of tests shows that no light signal is appearing any longer.

With the arrangement described above, it is possible to adapt the amplification of a measurement circuit to different conditions, so that a practically normalized measurement signal is available for use. Subsequent evaluation circuits then need no longer encompass such a wide working range as would be required without this normalization. This results, in turn, in relatively good resistance to interference.

The apparatus described in detail above may be used for detecting operating variables of an internal combustion engines, particularly in connection with regulating the instant of ignition in gasoline engines and regulating the onset of injection in Diesel engines.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for detecting operating characteristics of an internal combustion engine with a combustion chamber and a crankshaft, the apparatus having:
   an optical sensor connected to the engine to detect engine operating characteristics which generates an output indicative thereof;
   an amplifier connected to receive and amplify the optical sensor output;
   an evaluation circuit connected to the amplifier to receive the amplified optical sensor output and to evaluate the operating characteristics of the engine as a function of the amplified optical sensor output;
   a varying means connected to the amplifier to vary the transmission behaviour thereof, whereby the amplification factor of the amplifier is varied; and
   the varying means comprises an integration circuit connected to the amplifier to integrate the amplified optical sensor output and generate an output indicating a mean value for the amplified optical sensor output.

2. An apparatus for detecting operating characteristics of an internal combustion engine with a combustion chamber and a crankshaft, the apparatus having:
   an optical sensor connected to the engine to detect engine operating characteristics which generates an output indicative thereof;
   an amplifier connected to receive and amplify the optical sensor output;
   an evaluation circuit connected to the amplifier to receive the amplified optical sensor output and to evaluated the operating characteristics of the engine as a function of the amplified optical sensor output;
   a varying means connected to the amplifier to vary the transmission behaviour thereof, whereby the amplification factor of the amplifier is varied, and
   the varying means comprises a crankshaft angle detector connected to the crankshaft and the amplifier such that varying of the amplifier transmission behaviour occurs only upon occurrence of preselected crankshaft angles.

3. An apparatus for detecting operating characterstics of an internal combustion engine with a combustion chamber and a crankshaft, the apparatus having:
   an optical sensor connected to the engine to detect engine operating characteristics which generates an output indicative thereof;
   an amplifier connected to receive and amplify the optical sensor output;
   an evaluation circuit connected to the amplifier to receive the amplified optical sensor output and to evaluate the operating characteristics of the engine as a function of the amplified optical sensor output;
   a varying means connected to the amplifier to vary the transmission behaviour thereof, whereby the amplification factor of the amplifier is varied; and
   the varying means comprises a timing means connected to the amplifier such that varying of the amplified transmission behaviour occurs only during preselected times.

4. An apparatus for detecting operating characteristics of an internal combustion engine with a combustion chamber and a crankshaft, the apparatus having:
   an optical sensor connected to the engine to detect engine operating characteristics which generates an output indicative thereof and comprising a photo-diode connected to the combustion chamber to detect combustion flash and which generates an output indicative thereof;
   an amplifier connected to receive and amplify the optical sensor output;
   an evaluation circuit connected to the amplifier to receive the amplified optical sensor output and to evaluate the operating characteristics of the engine as a function of the amplified optical sensor output;
   a varying means connected to the amplifier to vary the transmission behaviour thereof, whereby the amplification factor of the amplifier is varied;
   a means to inhibit the varying means for changing the transmission behaviour of the amplifier; wherein during the output of the photo-diode to the amplifier the varying means generates a constant amplifier transmission behaviour.

5. An apparatus for detecting operating characteristics of an internal combustion engine with a combustion chamber and a crankshaft, the apparatus having:
   an optical sensor connected to the engine to detect engine operating characteristics which generates an output indicative thereof and comprising a photo-diode connected to the combustion chamber to detect combustion flash and which generates an output indicative thereof;
   an amplifier connected to receive and amplify the optical sensor output;
   an evaluation circuit connected to the amplifier to receive the amplified optical sensor output and to evaluate the operating characteristics of the engine as a function of the amplified optical sensor output;
   a varying means connected to the amplifier to vary the transmission behaviour thereof, whereby the amplification factor of the amplifier is varied; and
   the varying means is also connected to the engine to detect further operating characteristics such that varying of the amplifier transmission behaviour occurs according to the further operating characteristics.

6. An apparatus as defined in claim 5, wherein the varying means is further connected to the engine and amplifier, such that the amplifier transmission behavior is increased at engine idling and is decreased at engine full load.

* * * * *